Dec. 14, 1965 A. O. WILSON 3,223,405
JAWS FOR A VISE
Filed July 24, 1963
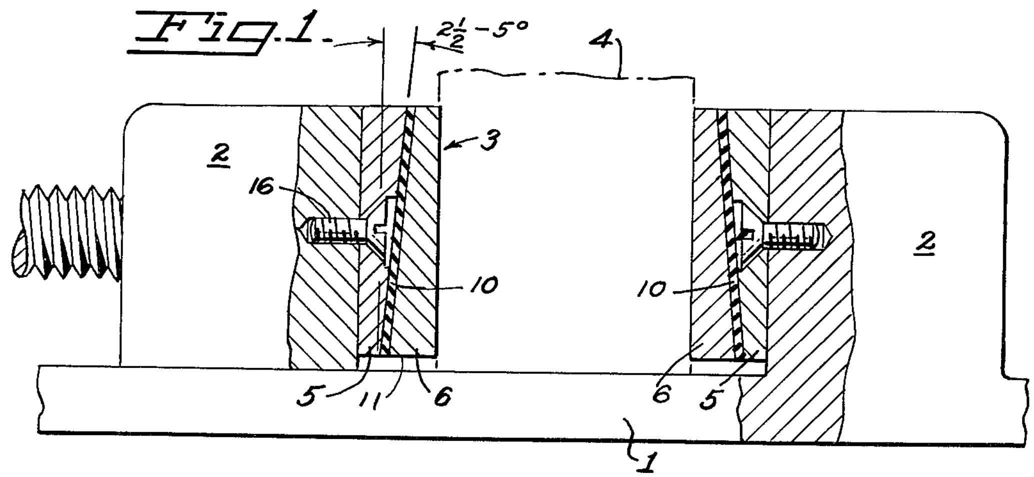
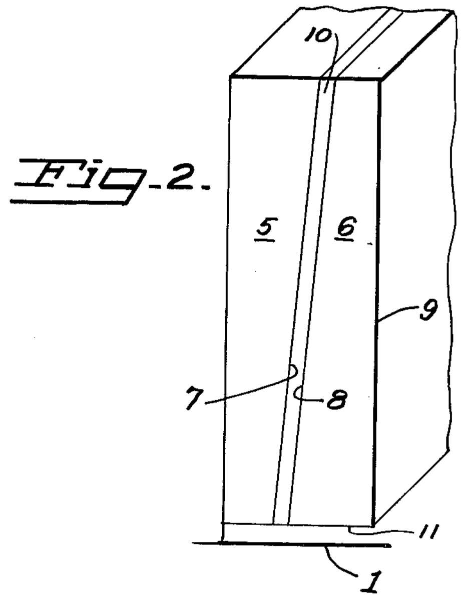
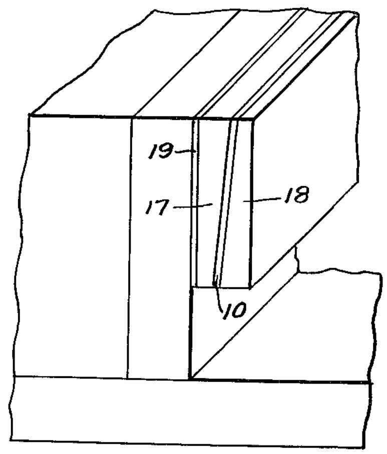
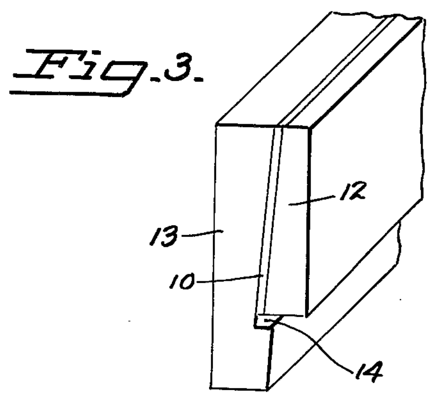
INVENTOR.
ARTHUR O. WILSON
BY George B. White
ATTORNEY United States Patent Office 3,223,405

Patented Dec. 14, 1965

3,223,405

JAWS FOR A VISE

Arthur O. Wilson, San Bruno, Calif., assignor of one-half to Nicholas Gust, Pacifica, Calif.

Filed July 24, 1963, Ser. No. 297,428
7 Claims. (Cl. 269—137)

This invention relates to jaws for a machine vise.

In the usual jaws for a machine vise, particularly the jaws used in clamping the work on milling machines, shapers, planers, and the like, when the cutting tools are applied to the work, the work rises up outwardly from the jaws and usually must be tapped down by a hammer or the like. This inability of the jaws to clamp the work against rising when subjected to the working forces in the machine results in inaccuracy.

The primary object of the invention is to provide clamping jaws for a machine vise which jaws convert the forces applied to the clamped work so as to generate vertical inward or downward component forces for pressing the work downwardly or inwardly with respect to the vise and thereby to prevent the rising of the work and eliminate the need for hammering, indicating or using of feelers under the work.

Another object of the invention is to provide laminated jaws for a machine vise in which the meeting faces of the laminations are formed at downwardly inclined or tapering angles and wherein the inclined meeting faces of the laminations are separated by a compressible binder capable of limited resilient yielding so as to produce a downward and inward component force on the work clamped between the jaws, thereby to grip the work therein firmly and to equalize pressure over the entire holding surface on the workpiece and allowing for any distortion of the vise base in tightening against the work.

Another object of the invention is to provide clamping jaws for the vise in a milling machine or the like, which when the work is clamped by horizontal pressure between the jaws, generate vertical force components pulling the workpiece downwardly and inwardly toward and against the vise base.

I am aware that some changes may be made in the general arrangements and combinations of the several devices and parts, as well as in the details of the construction thereof without departing from the scope of the present invention as set forth in the following sepecification, and as defined in the following claims; hence I do not limit my invention to the exact arrangements and combinations of the said devices and parts as described in the said specification, nor do I confine myself to the exact details of the construction of the said parts as illustrated in the accompanying drawings.

With the foregoing and other objects in view, which will be made manifest in the following detailed description, reference is had to the accompanying drawings for the illustrative embodiment of the invention, wherein:

FIG. 1 is a partly sectional view of a vise with the laminated jaws shown in section in place thereon.

FIG. 2 is a perspective detail view of one of the laminated jaws in relative position to the line of the base.

FIG. 3 is a perspective detail view of another form of one of the laminated jaws.

FIG. 4 is a perspective view showing another form of a laminated jaw on a vise.

The method of holding or clamping work in a milling machine or the like by the herein described invention includes the steps of applying clamping pressure to the opposite faces of the work generally at right angles to the respective faces of the work, and then generating by the clamping forces component forces generally at right angles to the initial clamping forces so as to urge the work inwardly against a base surface, and so that the inward forces on the work are increased as the pressure on the work is increased. These inward forces on the work are applied by laminated clamping jaws or surfaces wherein the meeting surfaces of the laminations are inclined inwardly of the vise and wherein the laminations are spaced by resiliently compressible binder.

In the illustrative embodiment of the invention there is shown a vise base 1 provided with clamping members 2, at least one of which is movable relatively to the other. On each clamping member 2 is provided a jaw 3 so that the respective jaws 3 are opposite one another and are capable of engaging the workpiece 4 therebetween.

Each jaw 3 is made of at least two laminations 5 and 6. The lamination 5 is the fixed lamination because it is made of a plate of suitable material on the jaw clamping member 2 in fixed position. The outer face 7 of the fixed lamination 5 is tapered inwardly of the vise toward the vise base 1 and toward the clamping member 2 so that the fixed lamination 5 is cross-sectionally tapered inwardly of the vise. The other lamination 6 is a floating lamination and has its inner or meeting face 8 inclined parallel with the inclined face 7 of the fixed lamination 5 so that this floating lamination 6 cross-sectionally tapers upwardly or outwardly of the vise. The angle of incline of the meeting faces 7 and 8 relatively to the gripping jaw face 9 is such that the gripping jaw faces 9 are truly parallel for gripping the work.

The inclined meeting faces 7 and 8 are separated and held together by resiliently compressible spacer binder so as to permit a minute relative shifting of the floating lamination 6 relatively to the fixed lamination 5. The angle on the inclined faces relatively to the gripping face 9 is preferable between 2½° to 5° for the average workpiece. The spacer binder between the laminations in this illustrative embodiment is a neoprene pad 10 which is suitably bonded or vulcanized between the laminations 5 and 6 so as to equalize pressure over the entire holding area of the jaw face 9. The lower edge 11 of the floating lamination 6 is spaced from the vise base 1 so as to allow for the inward shift of the movable lamination 6.

The fixed lamination 5 may form an integral part of the vise or may be bolted on the vise and extend over the entire face of the jaw member 2, in which example the lower edges 11 of the laminations are spaced from the base 1 to allow for the downward shift of the floating lamination 6. In the form shown in FIG. 3 the floating lamination 12 is narrower than the fixed lamination 13, which latter is cut back to allow for space for downward shift of the floating lamination 12.

When the laminations are used on existing vises, then the fixed lamination 5 is attached the the present day jaw face of the vise by suitable means such as bolts or screws 16.

Another form shown in FIG. 4 has comparatively narrow lamination strips 17 and 18, both hardened, and the base strips 17 are secured to the vise jaws by suitable adhesive, such as double back tape 19. The strips 17 and 18 are separated by resilient pad such as the neoprene pad 10, as heretofore described.

In operation the laminations 5 and 6 of each jaw are separated by the resilient pad 10 which is suitably bonded to the inclined faces 7 and 8 so that when a workpiece 4 is gripped between the gripping faces 9 by simply placing the work in the vise and clamping it, in case of light pieces, by fingertip pressure only, and then by closing the vise jaws with hand pressure without hammering or applying excess force, firm grip is accomplished with a component force urging the work inwardly against the vise base 1 at all times due to the inward shift of the floating laminations 6 of the respective jaw faces. This pulls the work inwardly of the vise without the need for a magnetic chuck or the like. The holding of the workpiece in such manner improves the accuracy of the work of the machine. It prevents the distortion of the vise and prolongs the life of the vise; permits the gripping of the workpiece with minimum exertion of force, yet much more firmly than heretofore accomplished by vise jaws.

I claim:

1. A machine vise comprising
(a) relatively movable clamping members,
(b) a fixed jaw surface on each clamping member,
(c) a floating jaw lamination on each fixed jaw surface,
(d) the fixed surface and superimposed face of the adjacent jaw lamination being inclined so as to guide the respective floating jaw laminations inwardly of the vise,
(e) a resiliently yieldable pad bonded to the inclined surfaces of said jaw laminations to said fixed jaw surfaces so as to resiliently guide the floating jaw plate inwardly of the vise under clamping pressure.

2. Laminated jaws for a machine vise having clamping members, at least one of said clamping members being movable relatively to the other, and a base under and between said clamping members, each jaw comprising,
(a) a fixed lamination fixed to one of said clamping members
(b) a floating lamination superimposed on each fixed lamination
(c) a resilient binder element bonded to the superimposed faces of the laminations
(d) the superimposed faces of the adjacent laminations being inclined toward the base and away from the space between the jaws so that each floating lamination is wider at its edge nearer the base than at its other edge.

3. The jaws defined in claim 2, and
(e) the angle of incline of said superimposed faces being such as to locate the opposite faces of the floating laminations generally perpendicularly relatively to said base.

4. The jaws defined in claim 2, and
(e) the included angle between said inclined superimposed faces and the plane perpendicular to said base being about 2½° to 5°.

5. The jaw faces defined in claim 2, and
(e) the width of said superimposed plate being substantially equal, and being spaced from said base.

6. The jaws defined in claim 2, and
(e) adhesive means to secure each fixed lamination to a clamping member.

7. The jaws defined in claim 2, and
(e) said floating lamination being narrower than the adjacent fixed lamination, and
(f) the inclined superimposed face of said fixed lamination being recessed and forming a shoulder spaced from the lower edge of the superimposed floating lamination.

References Cited by the Examiner

UNITED STATES PATENTS

| | | | |
|---|---|---|---|
| 593,681 | 11/1897 | Obernesser | 269—138 X |
| 1,120,649 | 12/1914 | De Leeuw | 269—101 |
| 3,135,563 | 6/1964 | Hennessy | 308—88 |

FOREIGN PATENTS

| | | |
|---|---|---|
| 132,378 | 6/1929 | Switzerland. |

LESTER M. SWINGLE, *Primary Examiner.*

ROBERT C. RIORDON, *Examiner.*

ROBERT J. BUENZLE, *Assistant Examiner.*